Jan. 9, 1923. 1,441,842.
R. H. FOX.
METHOD AND APPARATUS FOR MAKING BALL BEARINGS.
FILED AUG. 23, 1920.
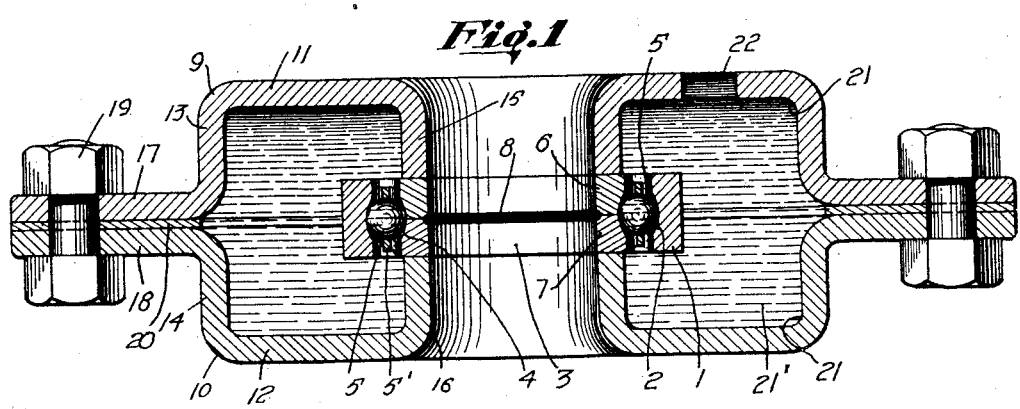
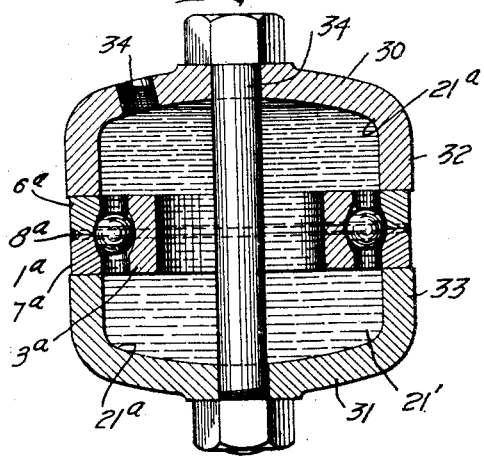
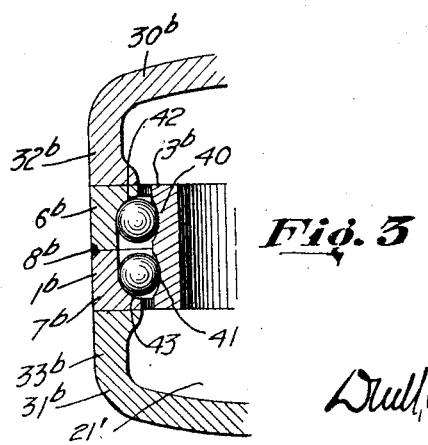
INVENTOR
R. H. Fox
BY
Dull, Warfield & Dull
ATTORNEY Patented Jan. 9, 1923.

1,441,842

UNITED STATES PATENT OFFICE.

RUDOLPH H. FOX, OF HARTFORD, CONNECTICUT.

METHOD AND APPARATUS FOR MAKING BALL BEARINGS.

Application filed August 23, 1920. Serial No. 405,456.

*To all whom it may concern:*

Be it known that I, RUDOLPH H. FOX, a citizen of the United States, residing at Hartford, in the county of Hartford and State of Connecticut, have invented certain new and useful Improvements in Methods and Apparatus for Making Ball Bearings, of which the following is a full, clear, and exact description, such as will enable others skilled in the art to which it appertains to make and use the same.

This invention relates to ball bearings, and to a method and apparatus for making the same.

With respect to some of its more specific details it relates to a ball bearing of the type employing a plurality of concentric rings or annular members having one or more rows of bearing balls disposed thereand between and rolling in opposed grooves or races in the respective rings. The ball bearing construction may be of the radial contact type for transmitting radial loads or of the angular contact type for transmitting thrust and radial loads.

The invention further relates in some of its specific details to a method of constructing and assembling ball bearings of the types mentioned and in which complementary sections of one of the bearing rings are united by the application of heat, as, for example, by a process of welding, whereby the parts are joined in a self contained, inseparable unit.

The invention further relates in some of its specific details to an apparatus which is adapted to grip the sides of one of the rings of a ball bearing member and to contain a heat conducting medium in contact with parts of the ball bearing which is being assembled so that the heat employed in the process of welding adjacent ring section of bearing ring is conducted away from the bearing parts.

In constructing and assembling bearings of the class mentioned, in which adjacent ring sections are welded together, there is danger in the welding process that the temper of parts of the bearing may be drawn so as greatly to injure the life of the bearing, or that the ring may be warped or otherwise deformed so as to interfere with the free and easy running of the balls in their races, or to injure the adjustment thereof.

It is therefore an object of this invention to provide an improved method and apparatus for assembling a ball bearing of the class mentioned whereby injury to the bearing is avoided when heat is applied to parts thereof.

It is a further object of the invention to provide improved means for conducting away from parts of a ball bearing heat which is employed in the process of assembling.

It is a further object to provide an improved method and apparatus for constructing ball bearings which is simple and inexpensive and will satisfy the requirements of commercial production.

It is a further object to provide an improved construction for a ball bearing whereby the permanent assembly of the parts is greatly facilitated and commercial production expedited.

Other objects will be in part obvious as the detailed description proceeds, and in part pointed out in said description.

The invention accordingly consists in the features of construction, combinations of elements and arrangement of parts which will be exemplified in the construction hereinafter set forth, and the scope of the application of which will be indicated in the following claims.

In the accompanying drawing forming part of the specification, several illustrative embodiments of the invention are shown. In said drawing:—

Figure 1 is a central transverse section of a ball bearing with the parts in assembled relationship and showing also in section the apparatus which is employed in the assembly of the bearing;

Fig. 2 is a sectional view similar to Figure 1, but showing a modification; and

Fig. 3 is a fragmentary sectional view corresponding approximately to the left hand portion of Fig. 2 but showing a still further modification.

Referring now to the drawing for a detailed description of the illustrative embodiment of the invention, the form shown in Fig. 1 comprises a ball bearing having an outer steel ring 1 which has a groove 2 formed on the inner surface thereof and extending entirely around the ring. Spaced a short distance from the bearing ring 1 and disposed concentrically therewith is a second steel ring 3 having a groove 4 on the external periphery thereof juxtaposed to the groove 2 and cooperating therewith to provide a ball race in which bearing balls 5 are adapted to run and transmit stresses between the bearing rings. As shown, ring 1 is constructed of a single integral piece of metal, whereas ring 3 is made up of two annular sections 6 and 7 disposed side by side. It is obvious, however, that more than two such annular sections may be employed to make up the bearing ring if found desirable. The annular sections have smooth abutting faces and are preferably secured together along the edges of their abutting faces by welding or other method employing application of heat, thus forming an integral joint 8 between the two sections and firmly securing them together to form the inner ring. It is to be understood that a shaft or supporting member passes through the opening in the ring 3 when the bearing is assembled for use; to permit such member to pass freely through the ring and form a firm bearing against the inner surface thereof the welded joint is smoothed off flush with the surface. The outer ring 1 when operatively assembled for use is also supported by a carrying or carried member as will be clear to those skilled in the art. It will also be clear that the bearing may be of the radial contact type for transmitting radial loads, or of the angular contact type for transmitting radial and thrust loads.

A ball retainer or cage 5' spaced between the inner and outer bearing rings and having openings for receiving the balls 5 may be provided. This retaining ring is preferably constructed of metal and in a single integral piece and its function is to hold the balls in the races and in properly spaced relationship both in assembling the bearing and when the same is installed for actual operation.

It will be obvious from the above description that the bearing may be readily assembled by placing one of the inner ring sections in position concentrically within the outer ring, placing the balls and ball retainer in position in the ball race, placing the other inner ring section in contact with the thrust section and finally welding the annular ring sections together.

To assist in assembling the bearing in a commercially practicable manner and to prevent undue heating and consequent warping or otherwise deforming parts of the bearing and to prevent temper drawing of the hardened parts of the bearing an improved assembling apparatus has been devised. Referring to the modification disclosed in Fig. 1 of the drawing this apparatus consists of two complementary annular sections designated generally by the reference numerals 9 and 10, preferably constructed of metal and having parallel web portions 11 and 12, outer annular flanges 13 and 14 and inner annular flanges 15 and 16, the flanges preferably being integral with the web. Extending from the outer flange of each section are flange extensions 17 and 18 which extend parallel to each other and are provided with aligning apertures through which bolts 19 pass to hold the sections in cooperative relationship. A resilient packing ring 20 may be placed between these flange extensions so as to provide a tight joint and at the same time to provide means to permit the bearing to be firmly gripped between the inner ends of the flanges.

The flange construction of each annular section, as described above, provides an annular recess 21 and when in the assembled cooperating relationship shown in Fig. 1 these two recesses unite to form a single annular chamber which is adapted to contain a heat conducting medium 21' such as mercury or oil. An aperture 22 is provided in one of the sections for the insertion and removal of the heat conducting medium and as a vent for any gas found in the course of the welding operation.

As shown in the drawings the flanges 15 and 16 cooperate to grip the sides of the sectional ring to hold the parts of the bearing in position when being assembled and in this position the outer ring 1, the balls and the inner side of the sectional ring extend into the chamber containing the heat conducting medium. The contacting edges of the flanges 15 and 16 may, if desired, be provided with packing rings to assist in making tight joints at the points where these flanges engage the bearing ring. The sections of the ring 3 are welded together when the parts are in the relationship shown in Fig. 1, the heat conducting medium of the chamber coming into contact with the parts of the bearing so that the excess heat produced by the welding operation is rapidly conducted away from the bearing parts and undue heating thereof avoided.

In the modification shown in Fig. 2 of the drawing the construction is somewhat similar to that of Fig. 1 but in this modification the outer bearing ring 1ª is made up of two adjacent sections 6ª and 7ª which are welded together as at 8ª while the inner ring 3ª of the bearing is unitary throughout.

The bearing itself therefore differs from the modification shown in Fig. 1 by having its outer ring sectional, rather than its inner ring, as in the case of Fig. 1. The assembling apparatus is correspondingly modified in this case, and as shown comprises two complementary cup-shaped sections 30 and 31 having peripheral annular flanges 32 and 33 which are adapted to engage the edges of the outer ring sections to clamp the same in position in the assembling apparatus. In this case also packing rings may be employed along the edges of annular flanges 32 and 33 so as to form a tight joint where these flanges contact with the bearing ring. The complementary sections 30 and 31 are provided with central aligning apertures through which extends a clamping bolt 34. The flanges of each complementary section provides an interior recess 21ª and these two recesses cooperate to form a chamber which contains the heat conducting medium 21', as in the modification previously described. An opening 34 for the insertion and removal of the heat conducting medium is provided in one of the sections.

In the modification of Fig. 3 the assembling apparatus is similar to that of Fig. 2 and the bearing ring construction is generally similar to that of Fig. 2, the corresponding parts being designated by the same reference numerals, with the addition of index "b." In this case, however, two ball races are provided for two rows of bearing balls. For this purpose the inner ring 3ᵇ is provided with adjacent grooves 40 and 41 and the outer sectional ring 1ᵇ is provided with corresponding grooves 42 and 43. The sections 6ᵇ and 7ᵇ of the outer ring are united preferably by welding as in the other modifications. As in the other modifications also the form of ball bearing contact may be radial, angular or a combination of radial and angular for transmitting the different character of loads as pointed out above. If desired one-piece retaining rings, similar to retaining ring 5' of Fig. 1, may be employed in the modifications of Figs. 2 and 3. It will be obvious that the assembling operation in this case is similar to that in the cases previously described.

Having described my invention what I claim as new and desire to secure by Letters Patent is:

1. An apparatus for integrally uniting metallic parts by application of heat provided with means for carrying a heat-conducting medium in contact with said parts to conduct away the excess heat imparted thereto by the uniting process.

2. In an apparatus for assembling ball bearings, in combination, a casing having means for engaging the bearing, said casing carrying a heat conducting medium in contact with said bearing for conducting heat from the same in the process of assembly.

3. In an apparatus for assembling ball bearings, in combination, means for clamping parts of the bearing in contacting relationship while said parts are being united by the application of heat, and a heat conducting liquid in contact with parts of said bearing.

4. In an apparatus for assembling ball bearings, in combination, means for clamping parts of the bearings in contacting relationship while said parts are being united by the application of heat, said clamping means carrying a heat conducting medium in contact with said bearing.

5. In an apparatus for assembling ball bearings, in combination, a pair of complementary members cooperating to form a chamber, flanges on said members adapted to engage parts of the bearing and hold the same in contacting relationship during the application of heat thereto, and a heat conducting fluid in said chamber in contact with parts of said bearings.

6. In an apparatus for assembling ball bearings, in combination, a pair of complementary members cooperating to form a chamber, flanges on said members adapted to engage parts of the bearings and hold the same in contacting relationship during the application of heat thereto, a heat conducting fluid in said chamber in contact with parts of said bearing, and means to secure said members in cooperative relationship.

7. In an apparatus for assembling ball bearings, in combination, a pair of complementary members cooperating to form an annular chamber in which the bearing is disposed, flanges on said members adapted to engage parts of the bearing to hold them in contacting relationship during the application of heat thereto, and a heat conducting fluid in said chamber in contact with parts of said bearing.

8. A method of constructing ball bearings having concentric rings which consists in forming one of said rings in a plurality of sections, assembling the sections to form a ring concentric with another bearing ring, inseparably uniting said sections by the application of heat and conducting the excess heat away from said bearing by means of a heat conducting medium in contact with the same.

9. A method of manufacturing bearings having concentric rings with registering races and balls fitting said races which consists in forming one of said rings in sections with complementary surfaces which when juxtaposed constitute one of said races, assembling said sections concentric to the other bearing ring with the balls positioned in said races, and finally integrally welding together said sections at an area removed from said balls.

10. A method of integrally uniting metallic bearing parts which includes assembling the parts in co-operative relationship, uniting the same by application of heat, and conducting the excess heat from said parts by a fluid heat-conducting medium in contact with the same.

In testimony whereof I affix my signature, in the presence of two witnesses.

RUDOLPH H. FOX.

Witnesses:
L. A. WATSON,
M. A. CASHIN.